United States Patent

Fang et al.

[15] 3,679,985

[45] July 25, 1972

[54] ACOUSTIC WAVE PARAMETRIC AMPLIFIER/CONVERTER

[72] Inventors: Frank F. Fang, Yorktown Heights; Eric G. Lean, Mahopac, both of N.Y.

[73] Assignee: International Business Machines Corporation, Armonk, N.Y.

[22] Filed: June 30, 1970

[21] Appl. No.: 51,287

[52] U.S. Cl...................................330/4.6, 330/5.5, 330/4.9

[51] Int. Cl...........................................................H03f 7/00

[58] Field of Search......................307/88.3; 330/4.6, 5.5, 4.9

[56] References Cited

UNITED STATES PATENTS

| | | | |
|---|---|---|---|
| 3,388,334 | 6/1968 | Adler | 330/5.5 |
| 3,200,354 | 8/1965 | White | 330/5.5 |
| 3,582,540 | 6/1971 | Adler et al. | 330/5.5 |

OTHER PUBLICATIONS

Chao, " Applied Physics Letters," May 15, 1970, pp. 399–401.

White, " Proc. IEEE," August 1970, pp. 1,238– 1,276.

*Primary Examiner*—John Kominski
*Assistant Examiner*—Darwin R. Hostetter
*Attorney*—Hanifin and Jancin and Jackson E. Stanland

[57] ABSTRACT

A parametric device for acoustic waves which does not depend on the non-linearities of a medium for operation. Both degenerate and non-degenerate parametric amplifier/converters are provided in which first order velocity changes give parametric interactions. The electric field associated with an acoustic wave in a piezolectric medium is modulated by an electric pump wave. This is accomplished by modulating the conductivity of a region in the piezoelectric medium, or close to that medium. The resulting modulation of the K-vector of the acoustic wave leads to parametric interactions between the acoustic signal wave, the electric pump wave, and the generated idler wave. Various effects, such as the field effect and the photoconductive effect, are used to modulate the conductivity of the region.

11 Claims, 5 Drawing Figures

INVENTORS
FRANK F. FANG
ERIC G. LEAN

BY J. E. [signature]
AGENT

ACOUSTIC WAVE PARAMETRIC AMPLIFIER/CONVERTER

CROSS REFERENCE TO RELATED APPLICATIONS

Copending application Ser. No. 51,286, assigned to the same assignee as the present application and filed the same day as this application, describes an acoustic amplifier in which a region of variable conductivity is located close to the surface on which the acoustic wave travels. Additional control of amplification is provided by varying the conductivity of this region.

BACKGROUND OF THE INVENTION

1. Field of the Invention

This invention relates to parametric devices for acoustic waves, and more particularly, to parametric amplifiers in which the velocity of the acoustic wave is changed through a first order effect to produce parametric interactions.

2. Description of the Prior Art

The concept of parametric interaction is well known in the prior art, and such interactions have been applied to acoustic wave devices. In general, parametric devices involve the interaction of three waves in a non-linear medium. These waves are the pump wave, the signal wave, and an idler wave which is generated by the interaction between the pump wave and the signal wave. Generally, idler waves are produced at the sum and difference frequencies of the pump wave and the signal wave. If the system is properly designed, one of the idler waves will be suppressed and energy will be transferred from the pump wave to the non-suppressed idler wave. Energy transfer between that idler wave and the signal wave causes amplification of the signal wave.

In a non-degenerate parametric amplifier, the frequency of the pump wave is not an integral multiple of that of the signal wave. The relative phases of the pump wave and the signal wave do not have to be adjusted in order to have proper energy transfer in the device. That is, the phases of the pump wave and the signal wave adjust themselves so that energy is transferred to an idler wave and then from that idler wave to the signal wave while the waves are propagating in the non-linear medium.

In a degenerate parametric device, the frequency of the pump wave is twice that of the signal wave. Also, the phases of the pump wave and the signal wave have to be adjusted in order that energy will be transferred from the pump wave to the signal wave. Generally, the peaks of the pump wave and the signal wave are in phase coincidence so that maximum amplification of the signal wave will occur.

The principles of parametric interaction are well known, and both degenerate and non-degenerate parametric devices have been shown in the prior art. As stated above, these parametric interactions have been applied to acoustic waves, as can be seen by referring to the IBM Technical Disclosure Bulletin, Vol. 12, No. 10, March, 1970 at page 1699. In this bulletin, a surface acoustic wave amplifier is described in which a signal acoustic wave and a pump acoustic wave interact due to non-linearities in the medium in which they propagate. In order to suppress one of the idler waves, a grating is used.

Another reference article of interest is a report by E. Lean et al., entitled "Acoustic Surface Wave Mixing in $\alpha$-Quartz." This report appears in Applied Physics Letters, Vol. 15, No. 1, July, 1969, on pages 10–12. The Lean et al. report describes the generation of sum and difference frequencies by parametric interactions of surface acoustic waves in $\alpha$-quartz.

As is apparent by a review of the art, prior parametric devices rely upon the non-linearities of a medium to cause interaction between a pump wave and a signal wave. Because these non-linearities are small, large amounts of input power are required. Because the coupling efficiency of these prior devices is small, the velocity changes of the signal wave are very small, being of the order of $10^{-3}$ percent. The combination of these disadvantages has seriously restricted the practical desirability of prior parametric amplifiers.

Accordingly, it is a primary object of this invention to provide a parametric device for acoustic waves in which parametric interaction does not rely on the non-linearities of the medium in which the waves travel.

Another object of this invention is to provide a parametric device for acoustic waves which does not require high power inputs, and which has a high coupling efficiency.

Still another object of this invention is to provide a parametric device for acoustic signal waves which does not require an acoustic pumping wave traveling colinearly with the acoustic signal wave.

A further object of this invention is to provide a parametric device for acoustic signal waves which utilizes an electric pump wave.

A still further object of this invention is to provide a parametric device for acoustic signal waves which directly utilizes velocity modulation of the signal waves by external means.

BRIEF SUMMARY OF THE INVENTION

In contrast with prior art devices, this parametric device (amplifier/converter) does not rely on the non-linearities present in the medium for parametric interactions. Instead, a first order effect is used, and the velocity of the signal wave is changed by an amount which is much greater than that previously obtainable. In this invention, an electric field is used to modulate the electric field associated with an elastic wave traveling in a piezoelectric medium. In this way, no acoustic input pump wave is required, and both non-degenerate and degenerate devices can be provided.

A medium is provided across which acoustic waves travel. This medium is a piezoelectric medium capable of supporting acoustic waves, and in particular Rayleigh surface acoustic waves. Located on the medium is a means for launching the acoustic waves and a means for detecting the waves. These means can be any type of transducer, depending upon the type of acoustic wave to be propagated along the piezoelectric medium. In the case of surface acoustic waves, an interdigital transducer of a type well known in the art is most suitable. These transducers have a frequency response up to the gHz range.

Means are provided for directly changing the velocity of the acoustic wave as it propagates across the medium. This means for velocity change modulates the propagation vector associated with the acoustic wave by shorting the electric field associated with the acoustic wave. It can be shown mathematically that modulation of the velocity of the signal wave with a suitable frequency generates a backward wave with an idler frequency traveling in the opposite direction to the signal wave.

Generally, the velocity changing means means comprises a region of electrical conductivity that is a portion of the piezoelectric medium or separate therefrom and which is capable of rapid conductivity changes when a field is applied to it. In one embodiment, the field effect is used to change the conductivity of a semiconductor film located on the surface of the piezoelectric medium across which the acoustic wave travels. Applying a variable voltage to the semiconductor film modulates the conductivity of this film and thereby affects the velocity of the nearby acoustic wave.

In another embodiment, the piezoelectric medium has an inversion layer created in one surface thereof due to the presence of an overlying oxide layer. Again, changes in the conductivity of the inversion layer affect the electric fields of the acoustic wave and cause rapid velocity changes in the acoustic wave.

In still another embodiment, the photoconductive effect is used for velocity modulation of the acoustic wave. In this case, a photoconductive film is deposited on the piezoelectric medium and the conductivity of this film is modulated at high frequencies by an input light beam. This affects the velocity of acoustic waves in the piezoelectric medium.

As is apparent, the only acoustic wave propagating in the piezoelectric medium is the signal wave. There is no acoustic pump wave which travels colinearly with the signal wave and exchanges energy with the signal wave. Instead, an electric pump wave is used. By rapidly modulating the conductivity of the medium, non-linear effects are induced externally. These conductivity changes short out the electric field associated with the acoustic waves. This in turn modulates the velocity of the acoustic waves. If the frequency of change of the conductivity of the piezoelectric medium is properly chosen, parametric amplification of the acoustic wave will result. For instance, if the conductivity is modulated at a frequency twice that of the signal acoustic wave, a degenerate parametric amplifier will be provided and energy will be delivered to the signal acoustic wave. If the periodicity of the elements used to change the conductivity of the aforementioned variable conductivity region is properly chosen, a non-degenerate parametric amplifier is provided. Since an input acoustic pump wave is not used, the $\omega$-$k$ dispersion diagram does not dictate a particular direction of propagation for the electric pump signal. Time and space variations in electrical conductivity achieve the effect of a separate acoustic pump wave but do not have to follow the $\omega$-$k$ diagram, as does an acoustic wave.

This device has advantages over conventional parametric devices. The piezoelectric medium need not have non-linearities in order to support a parametric interaction between two waves and a colinearly travelling pump wave is not required. Further, the velocity changes produced are of the order of $10^6$ times as great as those of prior art devices and therefore the amount of parametric interaction is greater.

Further, a much smaller amount of pumping power is required since parametric interaction does not rely on second-order effects due to non-linearities in the medium. The variation in electrical conductivity of a region in the medium, or close to it, has the same mathematical effect as that produced by the interaction of a pump acoustic wave and a signal acoustic wave. However, the restraints on wave propagation imposed by the $\omega$-$k$ diagram are not present since an acoustic pump wave is not used.

Another advantage relates to the ease of fabrication of these devices. It is generally quite simple to provide a region of variable conductivity on the piezoelectric medium or in close contact with the medium. Standard thin film techniques and conventional semiconductor techniques are used to produce the region of variable conductivity. Also, since the conductivity of a region can be varied from insulating to conducting, the efficiency of the present device is much greater than that of the prior art. This is especially true in the case of a surface acoustic wave, since the conductivity of a surface region can be changed rapidly over wide ranges.

The foregoing and other objects, features and advantages of the invention will be apparent from the following more particular description of the preferred embodiments of the invention as illustrated in the accompanying drawings.

DESCRIPTION OF THE PREFERRED EMBODIMENTS

Figure 1:
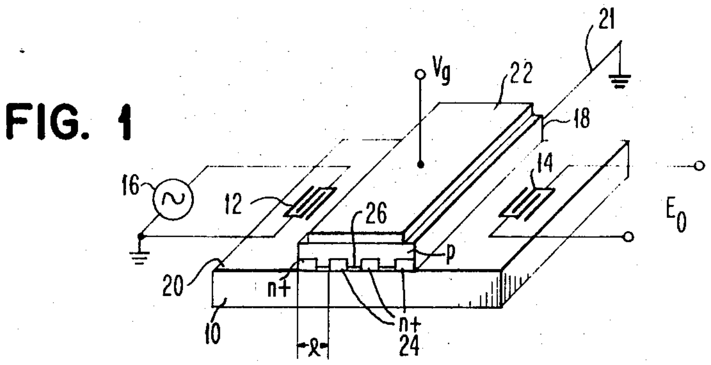
FIG. 1 is an illustration of an acoustic wave parametric device in which the velocity of the acoustic wave is directly modulated by the field effect in an associated semiconductor film.

FIG. 1 illustrates a parametric device for acoustic waves in which the conductivity of a region is time-modulated by the field effect.

A piezoelectric substrate 10 has acoustic-electric transducers 12, 14 located on one surface 20, which is polished mechanically or chemically. Transducer 12 is an input transducer and is connected to an excitation source 16. Transducer 14 is the output transducer at which the amplified acoustic wave is detected.

The device of FIG. 1 used the field effect to change the conductivity of a material 18 located on a surface 20 of the piezoelectric substrate 10. In this case, a *p*-type semiconductor film, such as silicon, is suitable. The surface of the semiconductor film adjacent piezoelectric substrate 10 is polished to provide intimate contact with the substrate. Polishing of the film and the substrate to fractions of a wavelength also prevents attenuation of the acoustic wave. Located on the top surface of film 18 is a metal electrode 22 to which is applied a gate voltage $V_g$. Various *n*+ regions 24 are provided in the *p*-type film. These regions have periodicity *l* and act as sources and sinks of electrons, depending upon the gate bias $V_g$. The *n*+ regions 24 are connected to a common ground by lead 21. When the gate voltage $V_g$ is applied, the conductivity of a thin inversion layer 26 located adjacent surface 20 of piezoelectric substrate 10 is changed. The use of *n*+ regions 24 enables more rapid change in conductivity of the inversion layer 26 depending upon the polarity and strength of the gate voltage $V_g$. The conductivity of the inversion layer 26 can be changed from insulating (no charge carriers present) to highly conducting. The device of FIG. 1 can operate as a degenerate or non-degenerate amplifier. For a degenerate amplifier, the periodicity *l* of *n*+ regions 24 is not critical, while for a non-degenerate amplifier, this spacing is important, and determines the frequency of the gate voltage $V_g$. These considerations will be discussed more fully later.

The device operates as follows: An acoustic wave is propagated along surface 20 of piezoelectric substrate 10 by excitation of input transducer 12. In the case of Rayleigh surface waves, interdigital transducers are appropriate, although other transducers could be used. The acoustic wave propagates along surface 20 and has associated with it an electric field. If the conductivity of the inversion layer 26 is varied, the velocity of the acoustic wave will be changed. This is due to the fact that areas of increased conductivity in the inversion layer will short the electric field associated with the acoustic wave. Shorting the electric field causes a velocity decrease. When the conductivity of the inversion layer is decreased, the velocity of the acoustic wave increases. Since velocity changes in the order of 2–3 percent are possible in this device, the amount of parametric interaction is greatly increased over that of prior art devices.

Depending upon the frequency of the voltage $V_g$, the acoustic wave will be amplified parametrically. For instance, if the frequency of gate voltage $V_g$ is twice that of the acoustic wave frequency, a degenerate parametric amplifier will be obtained, and the acoustic wave will be amplified. In the degenerate amplifier, the periodicity (*l*) of the *n*+ regions 24 is not important, and only two regions 24 need be provided. The acoustic wave is velocity modulated while traveling under inversion layer 26, if the conductivity of this region is time modulated while the acoustic wave is present.

The embodiment of FIG. 1 is suitable as a non-degenerate amplifier. Four *n*+ regions are shown here, being arranged with a periodicity *l*. The number of such regions is arbitrary, and their width is approximately *l*/2. The periodicity *l* is given by the following expression:

$$l = \frac{2\pi v_s}{\omega_s - \omega_i} \qquad (1)$$

where $v_s$ is the velocity of the acoustic signal wave, $\omega_s$ is the frequency of the acoustic signal wave, and $\omega_i$ is the frequency of the idler wave Depending on the periodicity $l$, the frequency of the applied gate voltage $\omega_p$ is given by $$\omega_p = 2\omega_s - \frac{2\pi v s}{l} \quad (2)$$

For any given periodicity ($l$), a voltage $V_g$ applied with frequency $\omega_p$ will produce an idler wave of frequency whose velocity $\omega_i/k_i$ is allowed in the dispersion curve. For this periodicity and frequency, parametric interactions can occur, with resulting amplification of the acoustic signal wave.

Non-degenerate parametric devices have the advantage that the phases of the input acoustic wave and the gate voltage do not have to have their relative phases adjusted before being applied to the system. Phase matching occurs automatically within the system, in a non-degenerate parametric amplifier.

The materials used to make a parametric device, as shown in FIG. 1, are conventionally well known. For instance, the acoustic wave propagating medium 10 is any piezoelectric material, such as gallium arsenide, cadmium sulfide, lithium niobate ($LiNbO_3$), etc. In the embodiment shown, the function of the variable conductivity region 26 is to short the electric field associated with the acoustic wave.

The amplitude of the voltage $V_g$ is chosen to be sufficient to completely deplete the inversion layer 26 of any charge carriers. This voltage is usually between 5 and 10 volts for a substrate 18 acceptor level of about $10^{16}/cm^3$ and a surface change of about $10^{13}/cm^3$. As is apparent to those skilled in semiconductor technology, the field effect can be used to cause a modulation of inversion layer conductivity or the conductivity of a film can be changed by a depletion layer of variable width (as was described in the aforesaid copending application Ser. No. 51,286.

The frequencies employed are a function of the geometry of the system and of the transducers used. For instance, interdigital transducers can be used to provide input acoustic waves having frequencies in the order of gHz. For a degenerate parametric amplifier, the frequency of the voltage $V_g$ will be twice that of the acoustic wave frequency.

The percentage change in velocity of the input acoustic wave in order to provide parametric amplification in a nonlinear medium is at least about $10^{-3}$ percent. However, the greater the change $\Delta v/v$ of the acoustic velocity $v$, the greater the parametric interaction. With this invention, velocity changes $\Delta v/v$ of the order of 2–3 percent are obtainable.

Figure 2:
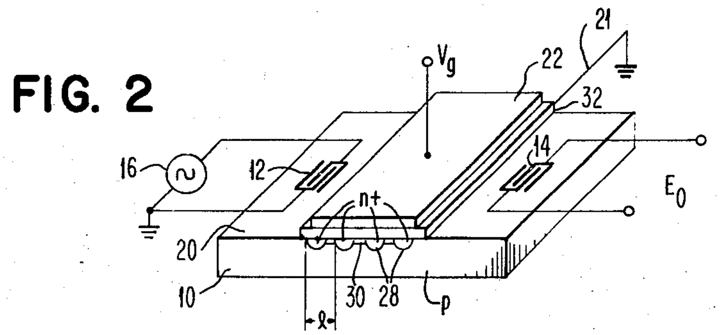
FIG. 2 is an illustration of an acoustic wave parametric device in which the velocity of an acoustic wave is directly modulated by a change in the conductivity of an inversion layer located in the medium in which the acoustic wave travels.

FIG. 2 shows another version of a parametric device according to this invention. For clarity, the same reference numerals are used where possible. In the device of FIG. 2, the piezoelectric medium has a region of variable conductivity in its top surface. That is, it serves as the wave propagating medium and is also the substrate for the inversion layer created by a nearby oxide layer.

In more detail, a piezoelectric substrate, 10, such as gallium arsenide, has transducers 12, 14 located on surface 20. As before, these transducers serve as input and output transducers for the acoustic waves. Since their function is the same as that of FIG. 1, the same reference numerals are used. Located in surface 20 of the $p$-type substrate 10 are $n+$ regions 28 (which are connected to ground by lead 21), which serve the same purpose as the $n+$ regions 24 of FIG. 1. That is, they aid in quickly changing the conductivity of an inversion layer 30 located near surface 20 and also provide periodic spatial modulation in a non-degenerate device.

Located over substrate 10 is an oxide layer 32 having a metal electrode 22 thereon. The oxide layer, when biased by gate voltage $V_g$, creates an inversion layer 30 near surface 20 of the piezoelectric substrate.

The device of FIG. 2 works similarly to that of FIG. 1. That is, by changing the gate bias $V_g$, the conductivity of inversion layer 30 is changed at a frequency corresponding g to the frequency of the gate voltage $V_g$. As explained previously, this produces an electric pump wave which modulates the velocity of the acoustic wave travelling along surface 20. This velocity change is used to provide parametric amplification.

Figure 3:
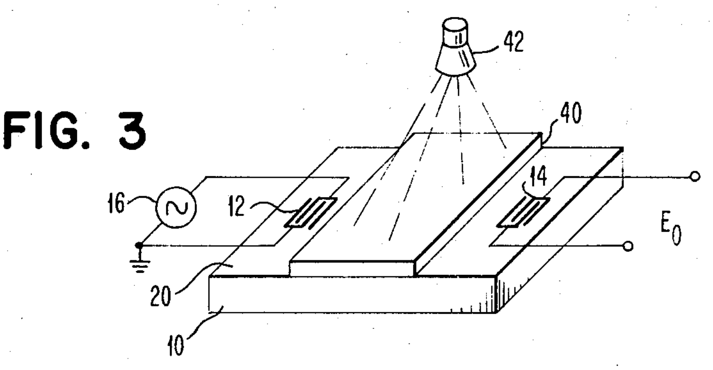
FIG. 3 is an illustration of an acoustic parametric device in which the photoconductive effect is used for direct velocity modulation of the acoustic wave.

FIG. 3 shows a parametric amplifier in which the photoconductive effect is used to change the velocity of the acoustic wave.

As before, a piezoelectric substrate 10 has input transducer 12 and output transducer 14. The input transducer is connected to a variable voltage source 16. Since the functions of the transducers and piezoelectric substrate are the same here as in the other embodiments, the same reference numerals will be used whenever possible.

Located on surface 20 of the piezoelectric substrate 10 is a photoconductive film 40, such as silicon. A light source 42, such as a gallium arsenide laser, is arranged to project light onto the photoconductive layer. The light source is one which can be switched at high frequency. For degenerate parametric amplification, the frequency of switching is twice the acoustic wave frequency.

Of course, if photoconductive layer 40 is replaced by photoconductive strips having a periodicity $l = 2\pi v_s/(\omega_s - \omega_i)$, a non-degenerate amplifier, similar to that of FIGS. 1 and 2, will be provided. If the light frequency is then chosen to be that given by equation (2), non-degenerate parametric amplification will result.

The amplifier of FIG. 3 operates similarly to the amplifiers of FIGS. 1 and 2. The velocity of the acoustic wave is modulated by changes in the conductivity of the photoconductive layer 40. These changes are caused by the time-modulated light impinging on the photoconductive layer.

The light intensity required is that which would enhance the conductivity of photoconductive layer 40 when required, such that the electric field associated with the surface acoustic wave is sufficiently modulated. The light frequency is matched to the material comprising the photoconductive layer and usually any frequency can be used. It is only necessary that the photon energy of the light be greater than the energy gap of the photoconductive material 40 in order to excite hole-electron pairs therein.

Figure 4:
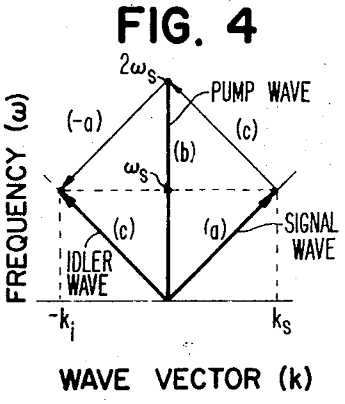
FIG. 4 is a $\omega$-$k$ diagram (dispersion curve) for a degenerate parametric device according to this invention.

FIG. 4 is a $\omega$-$k$ diagram for the parametric device of FIGS. 1–3, when used as a degenerate amplifier. The acoustic wave is represented by the vector ($a$) of frequency $\omega_s$ and wave vector $k_s$. The gate voltage is time varying only at a frequency $\omega_2$ equal to $2\omega_1$, and is represented by vector ($b$). Therefore, the wave vector $k_p$ is zero, since this is a standing wave. For conservation of energy and momentum, the following expressions apply:

$$\omega_p - \omega_s = \omega_i \quad 3$$

where $\omega_i$ is the idler wave represented by the vector ($c$), and $$k_p - k_s = k_i \quad 4$$

where $k_i$ is the wave vector of the idler wave ($c$).

Since $k_p$ is zero, equation 4 leads to:

$$k_i = -k_s.$$

Therefore, the idler wave has a frequency $\omega_i$ and is a backward wave having wave vector $-k_i$.

In order to have conservation of energy and momentum between the idler wave and the pump wave, the following expressions result:

$$\omega_p - \omega_i = 2\omega_s - \omega_s = \omega_s \quad 5$$

$$k_p - (-k_s) = 0 + k_s = k_s \quad 6$$

Therefore, the conservation of energy equation 3 leads to the result that the pump wave and the idler wave interact to produce a wave of frequency of $\omega_s$. For conservation of momentum, the pump wave and the idler wave interact to produce a wave moving in the forward direction having wave vector $k_s$. Therefore, there is amplification of an input acoustic wave.

Figure 5:
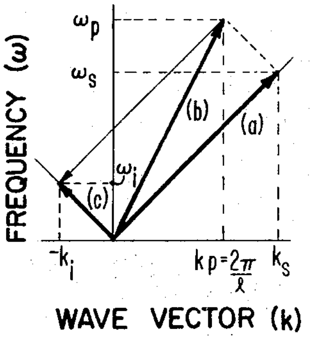
FIG. 5 is a $\omega$-$k$ diagram for a non-degenerate parametric device according to this invention.

FIG. 5 is a $\omega$-$k$ diagram for a non-degenerate device in which the acoustic signal wave is represented by vector ($a$), having frequency $\omega_s$ and wave vector $k_s$. The vector ($k$) corresponds to the applied gate voltage, and has a frequency $\omega_p$ and wave vector $k_p$. Interaction of the acoustic wave ($a$) and electric pump wave ($b$) generates an idler wave ($c$) having frequency $\omega_i$ and wave vector $k_i$ (which is negative). The idler wave and the pump wave then interact to deliver energy to the signal wave ($a$).

What has been described is a parametric amplifier for acoustic waves, in which the velocity of the acoustic wave is modulated to produce parametric amplification. The frequency at which the acoustic wave velocity is modulated is twice the frequency of the acoustic wave for parametric amplification. However, an arbitrary frequency for modulation is possible if the wave supporting means will provide conservation of energy and momentum at the idler frequency. Such materials may be found which would support the idler wave.

The devices of FIGS. 1–3 are easily fabricated by conventional semiconductor and thin film technology.

For instance, the variable conductivity film 18 in FIG. 1 can be grown on the underlying piezoelectric substrate 10, as for instance by epitaxial growth. In addition, such film can be deposited on the substrate. If the film is deposited directly on the substrate, techniques such as ion implementation can be used to form the $n+$ regions. Deposition of transducers on a substrate 10 is common and is usually done by electron beam technology or photoresist techniques, etc.

In the amplifier on FIG. 2, the oxide layer 32 can be directly deposited on the underlying substrate 10, in which $n+$ regions 28 have been diffused. The inversion layer may be introduced initially by a very thin (a few hundred angstroms) thermal oxide. The oxide change which determines the degree of initial surface inversion may be controlled by suitable annealing procedures known in the semiconductor art. The overlying electrode 22 is also conventionally produced.

The same considerations applied to the amplifier of FIG. 3, the photoconductive layer 40 being placed directly in contact with the piezoelectric substrate 10 or being grown thereon by a number of conventional techniques. These include evaporation, sputtering, and chemical vapor deposition.

It will be readily understood by someone skilled in the art that the concept of parametric amplification of an acoustic wave by velocity modulation is extendable to various types of acoustic waves. Because the conductivity of a thin layer can be more easily and quickly changed than that of a bulk material, the device is particularly suitable for parametric amplification of surface acoustic waves. Although the frequency of the applied gate voltage is twice that of the acoustic wave for degenerate amplification, use of an electric pump wave allows an arbitrary electric pump frequency, since the idler wave has a velocity that is supported by the medium.

What is claimed is:

1. A parametric device for acoustic signal waves, comprising:
   - a piezoelectric medium capable of supporting a surface acoustic signal wave;
   - means for introducing said surface acoustic wave into said piezoelectric medium;
   - means for generating an electric pump wave which parametrically interacts with said surface waves in said medium, said electric pump wave having a frequency $\omega_p$ related to the signal wave frequency $\omega_s$ by the expression $\omega_p = \omega_s + \omega_i$, where $\omega_i$ is the frequency of an idler wave supportable in said piezoelectric medium, said parametric interaction satisfying conservation of energy and momentum in said piezoelectric medium, wherein said means for generating said electric pump wave is comprised of a region of variable conductivity in close proximity to said piezoelectric medium which is responsive to a means for changing said conductivity periodically, said electric pump wave having a frequency twice that of said signal wave and being phase matched to said signal wave in said medium,
   - means for detecting said surface acoustic wave after said parametric interaction with said electric pump wave.

2. The device of claim 1, wherein said region comprises a surface inversion layer whose electrical conductivity is periodically varied by said conductivity changing means.

3. The device of claim 1, wherein said region comprises a semiconductor layer adjacent said piezoelectric medium, said semiconductor layer having an inversion layer in contact with said piezoelectric medium wherein said semiconductor layer is electrically connected to an electrical source for periodically varying the conductivity of said semiconductor layer.

4. The device of claim 1 where said region comprises a photoconductive layer adjacent said piezoelectric medium, and said conductivity changing means is a radiation source whose output is directed onto said photoconductive layer.

5. A parametric device for surface acoustic waves, comprising:
   - a piezoelectric medium capable of supporting said surface acoustic waves;
   - means for introducing said surface acoustic waves into said piezoelectric medium;
   - means for generating an electric pump wave which parametrically interacts with said surface waves in said medium, said electric pump wave having a frequency $\omega_p$ related to the signal wave frequency $\omega_s$ by the expression $\omega_p = \omega_s + \omega_i$, where $\omega_i$ is the frequency of an idler wave supportable in said piezoelectric medium, said parametric interaction satisfying conservation of energy and momentum in said piezoelectric medium, wherein said means for generating said electric pump wave is comprised of a region of variable conductivity responsive to a means for changing said conductivity periodically, said region including free electrical carrier sources having a spatial periodicity $l$ related to the wave vector $k_p$ of said electric pump wave by the relation $k_p = 2\pi/l$.

6. The device of claim 5, wherein said region comprises a surface inversion layer whose electrical conductivity is periodically varied by said conductivity changing means.

7. The device of claim 5, wherein said region comprises a semiconductor layer adjacent said piezoelectric medium, said semiconductor layer having an inversion layer in contact with said piezoelectric medium wherein said semiconductor layer is electrically connected to an electrical source for periodically varying the conductivity of said semiconductor layer.

8. The device of claim 5, where said region is a portion of said piezoelectric medium, and said means for changing said conductivity is an electrical source insulated from said region by a thin insulating region located between said electrical source and said region.

9. The device of claim 5, wherein said region of variable conductivity is a photoconductive material located adjacent said one surface of said medium, and said means for periodically varying the conductivity of said photoconductive layer is a radiation source whose output impinges upon said photoconductive layer.

10. The device of claim 9, wherein said photoconductive material is arranged in discrete regions adjacent said one surface, said regions having a periodic spacing $l$ related to the wave vector $k_p$ of the pump wave by the relations $k_p = 2\pi/l$.

11. The device of claim 5, wherein said region comprises a semiconductor layer adjacent said medium, said semiconductor layer having an inversion layer in contact with said piezoelectric medium, wherein said semiconductor layer is electrically connected to an electrical source for periodically varying the conductivity of said semiconductor layer.

* * * * *